Dec. 13, 1932.  M. B. BECK ET AL  1,891,137
STREET ILLUMINATION
Original Filed July 18, 1931  8 Sheets-Sheet 2

Dec. 13, 1932.  M. B. BECK ET AL  1,891,137

STREET ILLUMINATION

Original Filed July 18, 1931   8 Sheets-Sheet 3

FIG. 7.

STREET LIGHTING DATA.

Prototype Curve Values for Uniform Horizontal Illumination

Formulae:

When $\alpha$ is less than $\tan^{-1}\frac{M}{2}$ ... $(cp)\alpha = K\dfrac{H\cdot\mathrm{Sin}\,\mathrm{Cos}^{-1}\frac{\tan\alpha}{\pm M}}{\mathrm{Cos}^3\alpha}$ When $\alpha$ is greater than $\tan^{-1}\frac{M}{2}$ ... $(cp)\alpha = K\dfrac{1\cdot\mathrm{Sin}\,\mathrm{Cos}^{-1}\frac{M-\tan\alpha}{\pm M}}{\mathrm{Cos}^3\alpha}$

| Angle α | Equated to 100 C.P. at α=0 ||||| Equated to curve of 1000 lumens |||||
|---|---|---|---|---|---|---|---|---|---|---|
|  | M=4 | M=6 | M=8 | M=12 | M=16 | M=4 | M=6 | M=8 | M=12 | M=16 |
| 0° | 100 | 100 | 100 | 100 | 100 | 74 | 39 | 19 | 9 | 5 |
| 5° | 101 | 101 | 101 | 101 | 101 | 74 | 40 | 19 | 9 | 5 |
| 15° | 111 | 111 | 111 | 111 | 111 | 81 | 44 | 21 | 10 | 6 |
| 25° | 133 | 134 | 134 | 135 | 135 | 98 | 52 | 25 | 12 | 7 |
| 35° | 177 | 180 | 181 | 181 | 182 | 130 | 70 | 33 | 16 | 9 |
| 45° | 264 | 275 | 278 | 281 | 282 | 195 | 108 | 52 | 25 | 14 |
| 55° | 450 | 497 | 512 | 522 | 525 | 331 | 195 | 95 | 46 | 27 |
| 60° | 600 | . | . | . | . | 442 | . | . | . | . |
| 61° | 628 | . | . | . | . | 463 | . | . | . | . |
| 62° | 648 | . | . | . | . | 477 | . | . | . | . |
| 63° | 637 | . | . | . | . | 470 | . | . | . | . |
| 64° | 462 | . | . | . | . | 340 | . | . | . | . |
| 65° | 415 | 1126 | 1222 | 1281 | 1301 | 306 | 441 | 227 | 113 | 66 |
| 67°30' | . | 1422 | . | . | . | . | 557 | . | . | . |
| 70° | 276 | 1752 | 2159 | . | . | 204 | 687 | 400 | . | . |
| 71° | . | 1813 | . | . | . | . | 710 | . | . | . |
| 72° | . | 1312 | . | . | . | . | 514 | . | . | . |
| 72°30' | . | . | 2959 | . | . | . | . | 548 | . | . |
| 74° | . | 1083 | . | . | . | . | 425 | . | . | . |
| 75° | 26 | . | 3930 | 5155 | 5445 | 19 | . | 729 | 454 | 276 |
| 75°56' | 0 | . | . | . | . | 0 | . | . | . | . |
| 76 | . | 888 | 3272 | . | . | . | 348 | 606 | . | . |
| 77°30' | . | . | . | 8180 | . | . | . | . | 721 | . |
| 78° | . | 545 | 2407 | . | . | . | 213 | 446 | . | . |
| 80° | . | . | 1784 | 12665 | 16270 | . | . | 331 | 1114 | 824 |
| 80°32' | . | 0 | . | . | . | . | 0 | . | . | . |
| 80°52' | . | . | 0 | . | . | . | . | 0 | . | . |
| 81° | . | . | . | 8895 | 21070 | . | . | . | 783 | 1066 |
| 82° | . | . | . | 7775 | 27025 | . | . | . | 685 | 1369 |
| 82°30' | . | . | . | . | 29550 | . | . | . | . | . |
| 82°52' | . | . | . | . | 26100 | . | . | . | . | 1321 |
| 83° | . | . | . | 6460 | 22400 | . | . | . | 569 | 1133 |
| 84° | . | . | . | 3940 | 18150 | . | . | . | 347 | 920 |
| 85° | . | . | . | - | 11050 | . | . | . | . | 560 |
| 85°14' | . | . | . | 0 | . | . | . | . | 0 | . |
| 86°25' | . | . | . | . | 0 | . | . | . | . | 0 |
|  | K=50 | K=50 | K=50 | K=50 | K=50 | K=36.8 | K=19.6 | K=9.27 | K=4.40 | K=2.53 |

INVENTOR
Morris B. Beck
John D. Whittaker
BY William S. Hines
ATTORNEY

Dec. 13, 1932.   M. B. BECK ET AL   1,891,137
STREET ILLUMINATION
Original Filed July 18, 1931   8 Sheets-Sheet 4
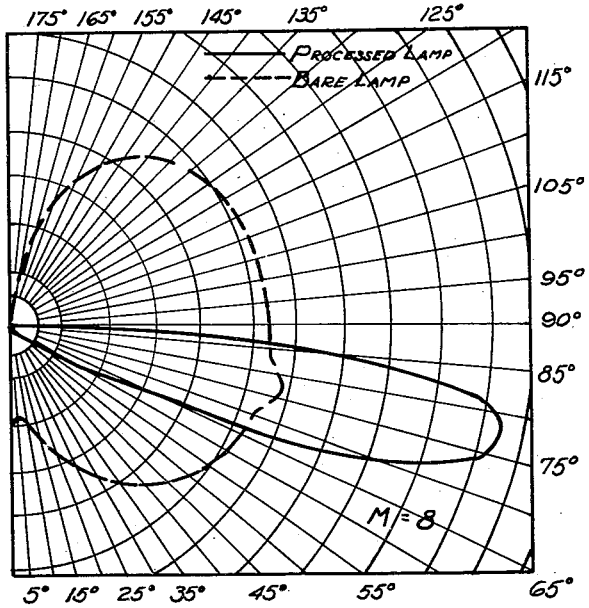
FIG. 8.
FIG. 10.
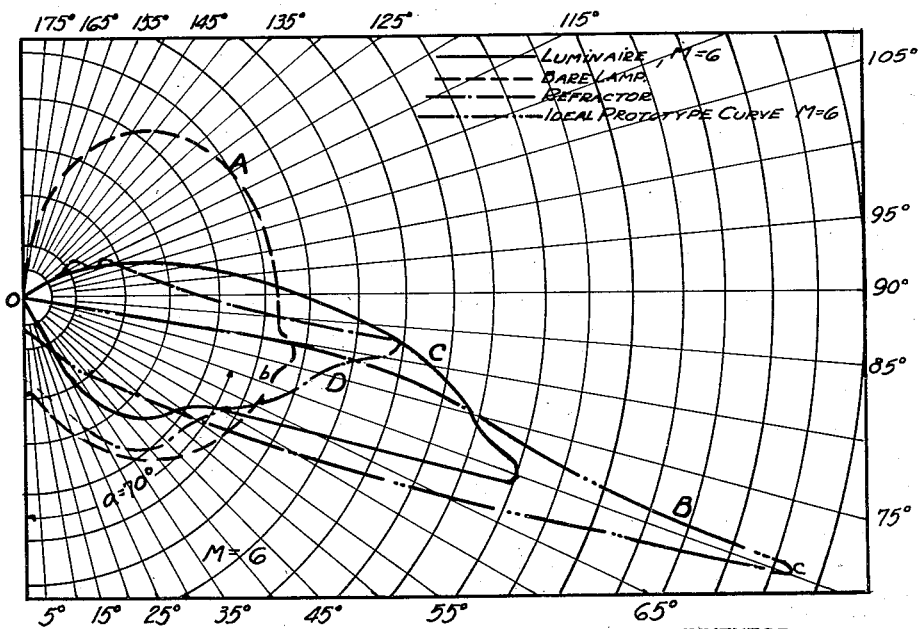
INVENTOR
Morris B. Beck
John D. Whittaker
BY William S. Glueck
ATTORNEY Dec. 13, 1932.  M. B. BECK ET AL  1,891,137
STREET ILLUMINATION
Original Filed July 18, 1931  8 Sheets-Sheet 6

RATIO OF STREET WIDTH TO MOUNTING HEIGHT.

INVENTOR
Morris B. Beck
John D. Whittaker
BY
William S. Glazier
ATTORNEY

Dec. 13, 1932. M. B. BECK ET AL 1,891,137
STREET ILLUMINATION
Original Filed July 18, 1931  8 Sheets-Sheet 8

Patented Dec. 13, 1932

1,891,137

UNITED STATES PATENT OFFICE

MORRIS B. BECK, OF NEW YORK, AND JOHN D. WHITTAKER, OF BABYLON, NEW YORK, ASSIGNORS TO WELSBACH STREET LIGHTING COMPANY OF AMERICA, OF PHILADELPHIA, PENNSYLVANIA, A CORPORATION OF DELAWARE

STREET ILLUMINATION

Substitute for application Serial No. 551,732, filed July 18, 1931. This application filed October 4, 1932.
Serial No. 636,240.

This application is to take the place of application Serial No. 551,732, filed on July 18, 1931.

Our invention relates to efficient planned scientific street lighting. It is authoritatively recognized by illuminating engineers and those versed in the art of street-lighting, that the flux of light from any light source, since it radiates in all directions unless controlled by controlling and directing accessories is totally unsuited for the production of such prototype light-distribution curves as are desirable and necessary for that quality of substantially uniform horizontal illumination required in planned scientific street-lighting. It is also well understood that even when street lighting units are used which are properly designed to produce the required prototype light-distribution curves but do so symmetrically, that is, when the candlepower distribution is the same in all vertical planes about the source, a large percentage of the light emitted downwardly by the unit reaches the ground outside the boundaries of the street pavement and sidewalks, which constitute the real working planes, and is either largely wasted or actually becomes an objectionable annoyance to those owning and/or occupying the property adjacent to the street-lighting units.

Some illumination is required, and desired, on the curbs and sidewalks and even a sufficient amount on the lawns, residences and other buildings for adequate police protection and other safety-functions of street-lighting, but beyond such requirements, all light which falls outside the working plane must be considered ineffective. Authorities agree that since a street has a long narrow area to be illuminated, this lack of lateral control will in many cases, allow a considerable portion of the light to be delivered outside of the street and sidewalk area. By directional control of light in lateral planes this condition can be remedied.

If, therefore, this objectionable and ineffective light can be so controlled and directed as to be prevented from falling into undesired places and can be directed upon the actual working plane of the street, the efficiency of the street-lighting system will be greatly increased and its effectiveness largely enhanced. The following definition has been given:

"Asymmetric means 'not symmetrical'. It means redirecting the light in side directions to deliver more toward the street than toward the houses and lawns."

It has been truly said:

"The waste of light on American streets due to lack of directional control is serious. The proper application of light-controlling equipment would increase the effectiveness of street lighting in general by a large percentage. Such equipment, while widely used today, is not as widely used as conditions justify. Light is just as valuable as the electricity which produces it or the dollars which buy the electricity. Wasting light is exactly the same as wasting electricity and wasting money. Good engineering in street lighting will take this factor into account."

Prior to our invention practically all attempts to accomplish the above object employed the principle of light refraction and not light-reflection and all made use of outside light-controlling and directing accessories, such as prismatic glass refractors.

While the desirability of the aforesaid asymmetric directional distribution of light for efficient street-lighting has been admitted by illuminating engineers for years to be the ideal for which to strive, its practical adoption by the public to any considerable degree in street lighting in America has been greatly deterred and delayed by the large expense involved by the use of the necessary accessories and equipment to transform and reshape the bare-lamp distribution by means of refracting glassware, the only type able to accomplish this object before our invention. This excessive expense consists of three factors:—(1) increased investment, due to relatively high cost of glassware and accessories; (2) high maintenance cost, due to replacement of broken glassware and accessories, outer enclosing globes broken by falling pieces of glassware inside the luminaires, and the cleaning and adjusting of the equipment; and (3) the loss of efficiency, necessarily involved through the absorption of light refraction, resulting in relatively low overall efficiencies of such refracting units.

These were the conditions in the art which confronted us before we made our invention, the objects of which are to produce a process which if followed, eliminates or minimizes, the aforesaid objections, and through the medium of our asymmetric directional light-control equipment, the objectionable excess light, which otherwise would fall on the abutting properties and buildings, is directed on to the sidewalks and pavements.

A further object of our invention is to produce a process, which if followed, will permit the attainment of very much lower investment and maintenance cost.

A further object is the attainment of very much higher efficiencies by entirely eliminating all outside reflecting and refracting accessories and their consequent expense and losses, and by utilizing the relatively large percentage of light which is distributed outside the street boundaries by all street-lighting units which have a symmetric distribution curve.

We have demonstrated in actual practice that over all efficiencies, that is the ratio of the total light output of a street lamp constructed in accordance with our process, to the total lumens emitted by a bare unprocessed street lamp, as high as 110% can be attained in the transformation of the bare unprocessed lamp-distribution into the ideal.

A further object is to attain the foregoing and yet, by following our process, produce an electric light bulb, useable in scientific street lighting and which is applicable to all standard types of street-lighting equipments.

A further object of our invention is to provide a process which, if followed, will result in the production of an electric street-lighting bulb in which the adjustment of the light directing media, necessary to produce the predetermined ideal light-distribution is immovable and therefore permanent.

A further object of our invention is to produce a process which if followed, will result in simplified lower-cost maintenance of street-lighting systems, due to the elimination of the cleaning and adjusting of all auxiliary glassware and accessories exterior to the electric street lighting bulb; eliminating of the handling, delivering and stocking of such relatively heavy and fragile equipment, and the saving of rental for, and maintenance of, the storage space, for such equipment.

A still further object of our invention is to produce a process, which if followed, will eliminate the lack of permanency of the adjustment of auxiliary glassware and accessories, with the consequence that the reliability and quality of the illumination results are increased.

A still further object of our invention is to produce a process, which, if followed in the construction and operation of planned scientific street-lighting systems, will realize the savings, economies and advantages of all of the above set forth objects.

For the purpose of deriving the ideal symmetric light-distribution curves for uniform horizontal street illumination, we have used the well known formulæ (1) and (2), given below:

*Formulæ*

(1) When $a$ is less than $\tan^{-1}\frac{M}{2}$ ... $(cp.) a = K \frac{1 + \sin \cos^{-1} \frac{\tan a}{\frac{1}{2}M}}{\cos^3 a}$ (2) When $a$ is greater than $\tan^{-1}\frac{M}{2}$ ... $(cp.) a = K \frac{1 - \sin \cos^{-1} \frac{M - \tan a}{\frac{1}{2}M}}{\cos^3 a}$ It is possible for one sufficiently versed in mathematics by means of these formulæ, to ascertain by the accompanying specifications, how such curves are constructed, reference being made to the accompanying drawings.

We shall proceed to describe the process by which we are able, as demonstrated in actual street lighting practice, to accomplish the objects herein set forth.

Referring specifically to the drawings:

Figure 4 is a diagram showing the relation of varying spacing distances to mounting heights for the values of M corresponding to Figure 1;

Figure 5 is a diagram showing the relation of varying spacing distance to mounting heights for the values of M corresponding to Figure 2;

Figure 6 is a diagram showing the relation of varying spacing distances to mounting heights for the values of M corresponding to Figure 3;

Figure 7 is a tabulation of prototype curve, candlepower values when various values of M are substituted in formulæ (1) and (2);

Figure 8 is a comparison of a light-distribution curve actually attained in practice from a symmetric street-lighting unit constructed in accordance with our process with the light-distribution curve, delivered by the same gas-filled, tungsten-filament, incandescent, series street-lamp, before it was processed. In this instance the lamp is processed so as to deliver a small amount of lumens upwardly to be utilized in any desired manner, such as illuminating the upper portion of an outer enclosing globe, etc.

Figure 9:
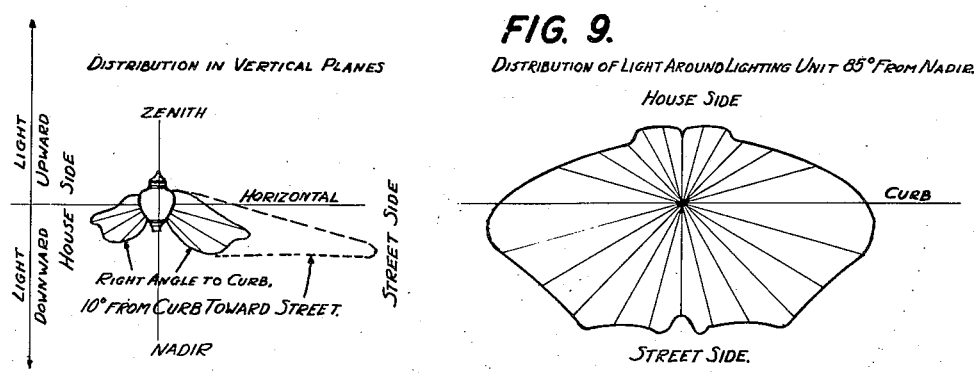

Figure 9 shows typical exploratory light-distribution curves about an asymmetric directional street-lighting unit, such as are usually observed and plotted to determine the form of the "solid", or tore of light emitted by the unit and the candlepower values at the various angles about the unit.

Figure 10 is a comparison of the light-distribution curves of a bare lamp, a street lighting unit constructed in accordance with our process, and the ideal shape of prototype curve for $M=6$, together with a distribution curve from a street lighting unit actually constructed by an exponent of the handling of light by refraction as hereinbefore outlined. These are symmetric types.

All light-distribution curves shown herein give 0° to 180° readings only, in the customary manner.

Figure 1:
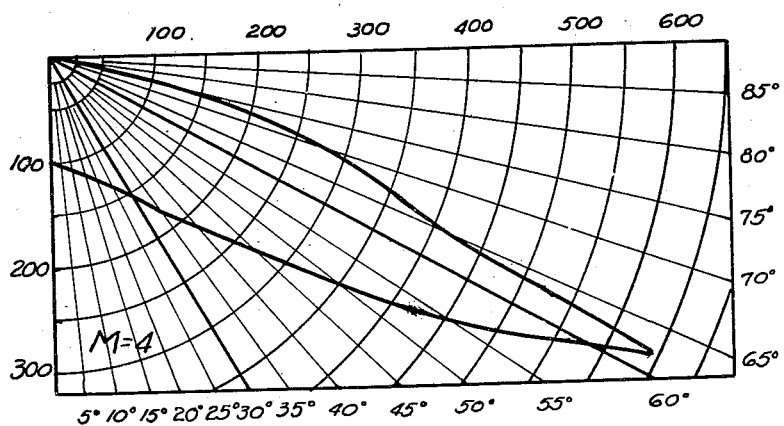
Figure 1 is a diagram of the symmetric ideal prototype curve for street lighting where $M=4$.
Figure 2:
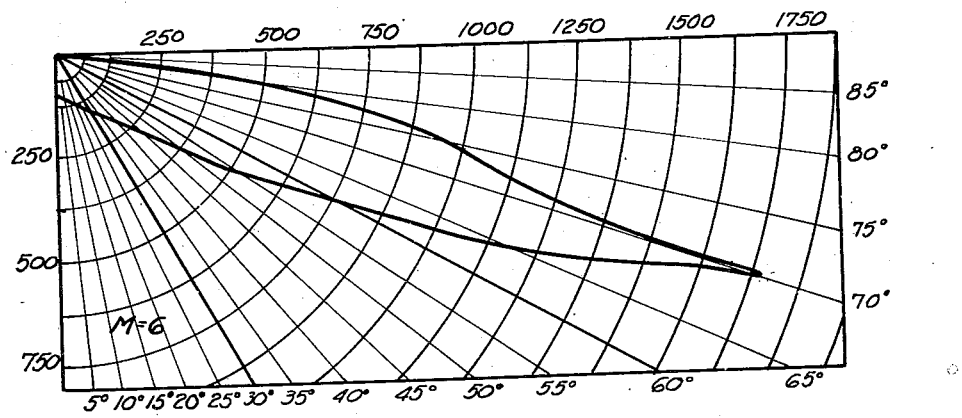
Figure 2 is a diagram of the symmetric ideal prototype curve for street lighting where $M=6$.
Figure 3:
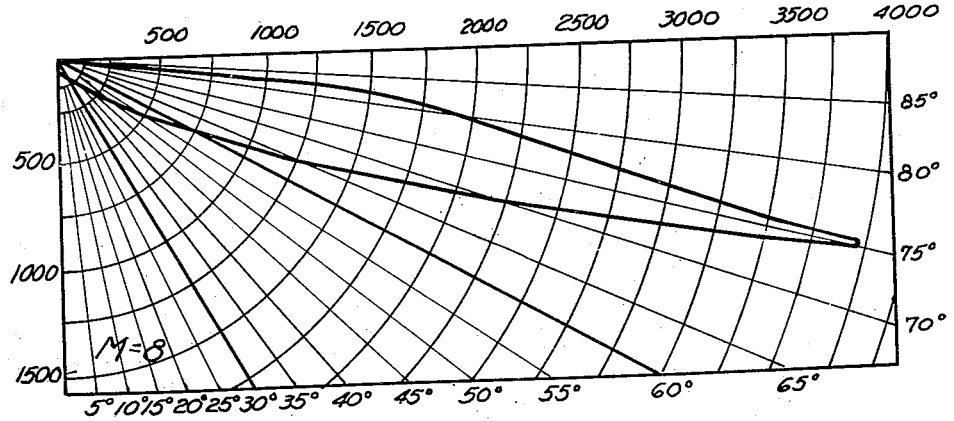
Figure 3 is a diagram of the symmetric ideal prototype curve for street lighting where $M=8$.
Figure 13:
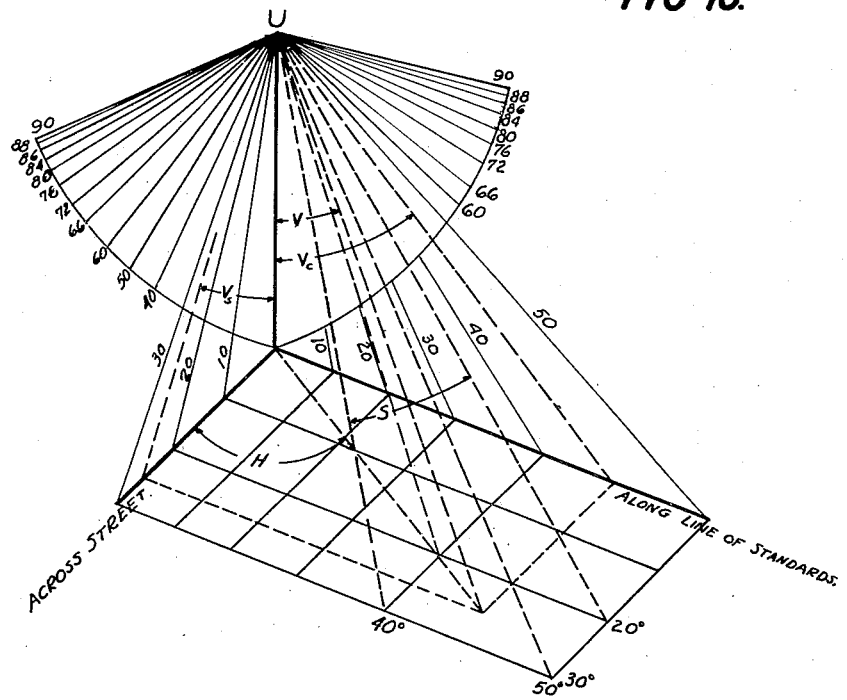
Figure 11:
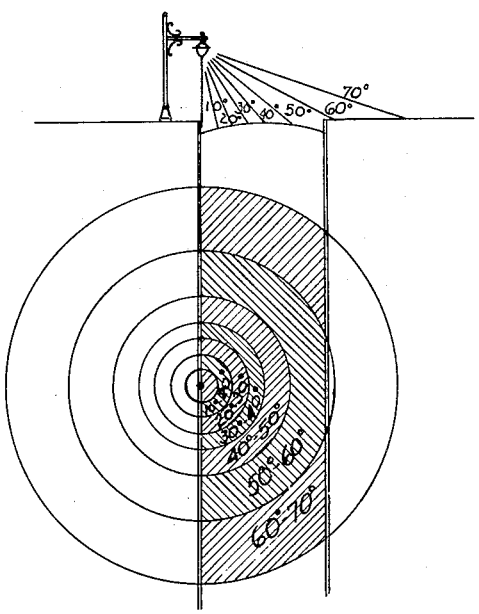
Figure 12:
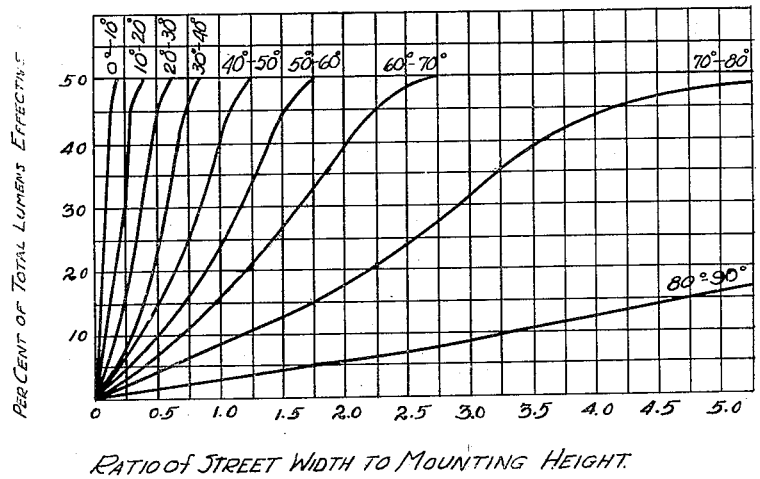
Figure 14:
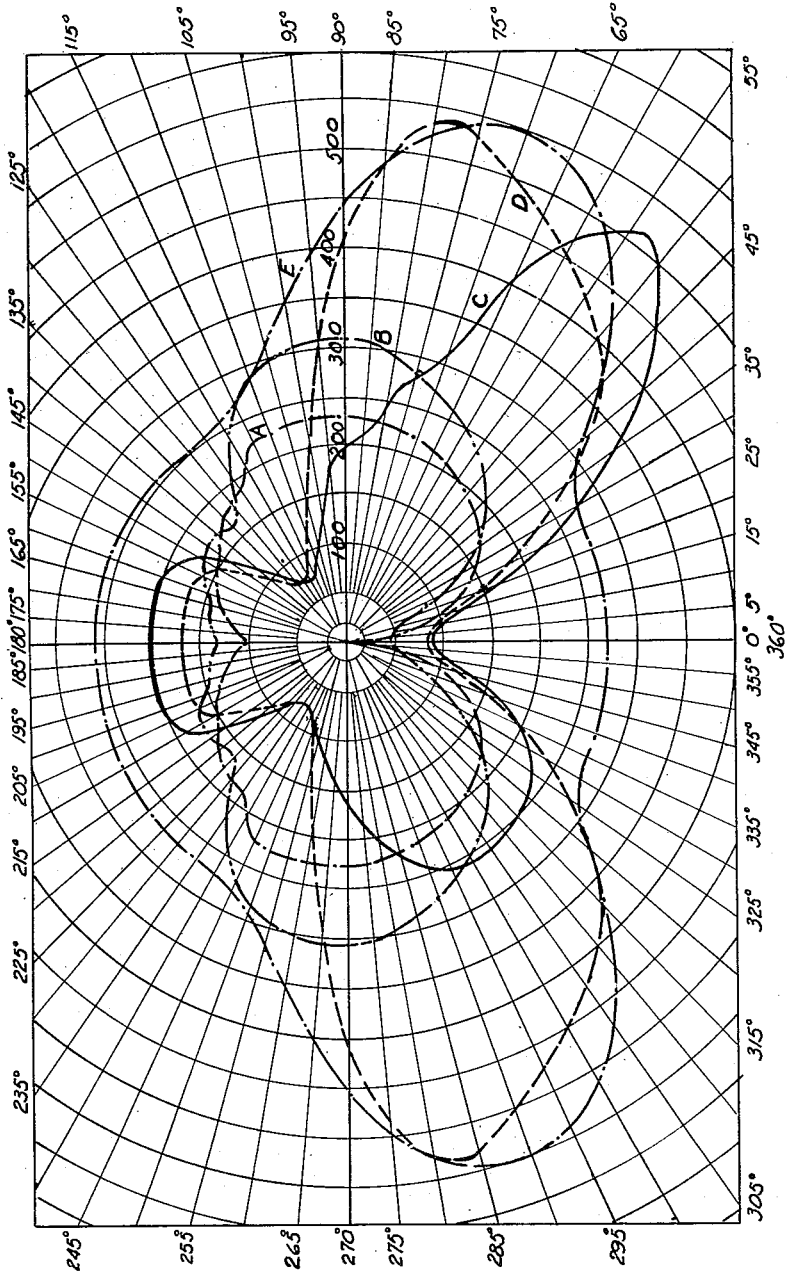
Figure 17:
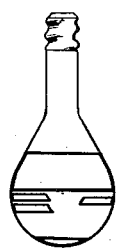
Figure 15:
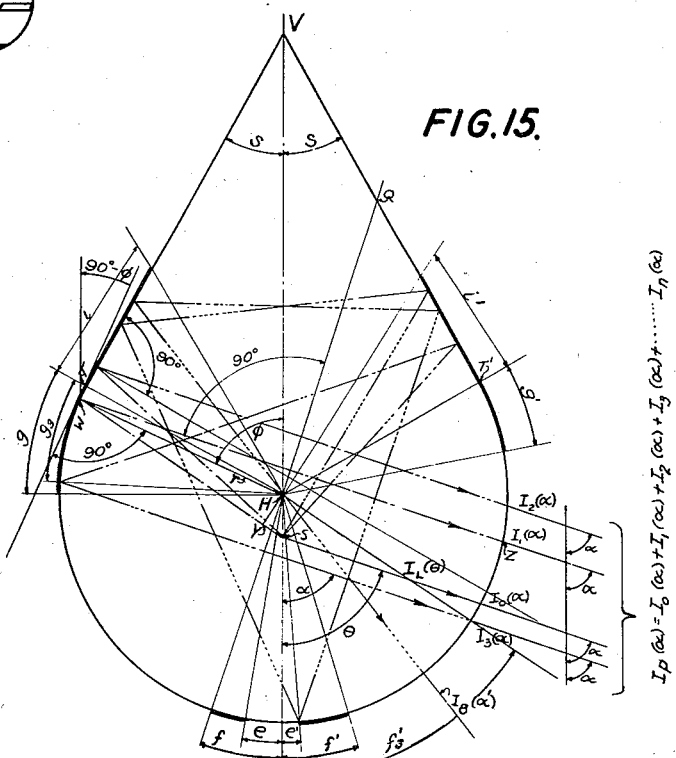
Figure 16:
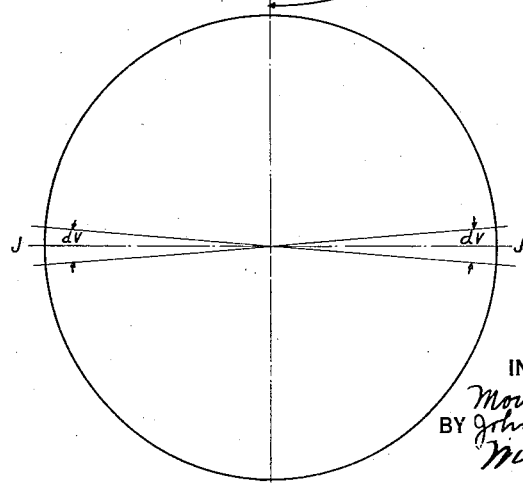

Figure 11 illustrates the method of determining what proportion of the zonal lumens emitted by a street-lighting unit having a symmetrical light-distribution curve, will fall upon the working plane of the street and what proportion will fall elsewhere;

Figure 12 is a graph of curves giving the percentages of zonal lumens from each zone of a street-lighting unit having a symmetrical light-distribution, which will be effective on the working plane of the street at various ratios of street width to mounting height;

Figure 13 is a perspective diagram of an assymetric street-lighting unit U and a section of a street illustrating the method of calculating the number of lumens intercepted by the various surface-sections of the street, and the additive and subtractive lumens needed on these surface-sections to produce the desired illumination;

Figure 14 is a comparison of the vertical light-distribution curve, A, of a clear 2,500 lumen lamp; the curve, B, of a clear 4,000 lumen lamp in a diffusing enclosing globe as ordinarily used in street-lighting; and light-distribution curves, for $m=8$, of a street-lighting unit constructed out of the same 2,500 lumen clear lamp and the same diffusing globe, in accordance with our process, these curves being taken in certain planes, namely, C, at right angles to the curb, or center line, of the street; D, at 22½ degrees outwardly from the curb, and, E, approximately in the 87-degree maximum lateral cone;

Figure 15 is a diagram for the location of light rays emitted from a point source and showing in any differential vertical angle formed by two planes intersecting along the axis of the bulb;

Figure 16 is a diagram representing a sectional plane taken in said differential vertical angle; and Figure 17 is a side elevation of a bulb having its outer surface processed in accordance with our invention.

In referring to the drawings and graphs, a series of symbols will be employed, a tabulation and description of which will now be given.

$a$ = angular direction of a ray of light measured from the nadir or point directly below the lamp. This represents the Greek symbol alpha.

$cp.$ = candlepower of a light emitted from a street lighting unit in a direction along the angle $a$.

$K$ = a constant governing the amount of flux included within the prototype symmetric curve.

$$M = \frac{\text{distance between adjacent light units.}}{\text{height of light unit above street}}$$

$h, h', h''$ = various heights of the street-lighting units.

$D, D', D''$ = various spacing distances corresponding to the above mounting heights.

$d, d', d''$ = various distances from base of post to mid-points between units.

$U$ = street-lighting unit.

$S$ = spherical angle which includes a zonal street surface-section under consideration.

$H$ = the horizontal angle which locates the plane of the average, or central, ray for a given zone under consideration in Figure 13.

$V$ = the vertical angle which locates the central ray for a given zone under consideration in Figure 13.

$V_s$ = the vertical angle to the midzone plane parallel to the curb in Figure 13 measured on the quadrant across the street.

$V_c$ = the vertical angle to the midzone plane perpendicular to the curb in Figure 13 measured on the quadrant parallel to the street.

$Y°$ = one-half the zonal angle inclosing the surface-section of the street under consideration in Figure 13. For 10-degree zones, $Y°$ would be 5-degrees.

$I$ = intensity of illumination in foot-candles at any point under consideration.

In each axial plane through the bulb, such as JJ, Figure 16, $I_L(\theta)$ represents the light intensity of bare lamp at angle $\theta$;

$I_P(a)$ represents the light intensity of prototype curve in that plane at angle $(a)$;

$I_o(a)$ represents the light intensity of processed lamp in that plane at angle $(a)$ due to unreflected light;

$I_1(a)$ represents the light intensity of processed lamp in that plane at angle $(a)$ due to the light that is reflected once from the spherical surface $g$, Figure 11, and emerges at angle $(a)$ through the spherical portion of the bulb;

$I_2(a)$ represents the light intensity of processed lamp in that plane at angle $(a)$ due to the light that is reflected once from the conical surface $i$, Figure 11, and emerges at angle ($a$) through the spherical portion of the bulb;

$I_s(a)$ represents the light intensity of the processed lamp in that plane at angle ($a$) due to the light that is reflected once from the conical surface $i'$, Figure 11, and then once from the spherical surface $g$, Figure 11, and emerges through the spherical portion of the bulb;

$I_8(a')$ represents the light intensity of the processed lamp in that plane at angle ($a'$) due to the light that is reflected once from the conical surface $i'$, then from the conical surface $i$, then from the lower spherical surface $f'$, then from the conical surface $i'$, then from the conical surface $i$, all in Figure 15, and emerges through the lower spherical portion of the bulb at an angle ($a'$) which is not equal to the angle ($a$);

The parameters of the lamp and other symbols used are as follows:

On the left side of Figure 15, $e$ is the angular spread, from the nadir, of a transparent portion of the bottom of the spherical portion of the bulb;

$f$ is the angular spread of the opaque specular reflective medium on the lower spherical portion of the bulb, when $e=O$, i. e., when said portion is completely covered;

$f-e$ is is the angular spread of the opaque specular reflective medium on the lower spherical portion of the bulb, when $e$ is greater than O, i. e. when a transparent portion of the lower spherical part of the bulb exists.

$i$ is the angular spread of the opaque specular reflective medium on the conical portion of the bulb;

$g$ is the angular spread of the opaque specular reflective medium on the upper spherical portion of the bulb;

$g_3$ is an angular spread of the opaque specular reflective medium on the upper spherical portion of the bulb which is greater than O and less than $g$;

T is the point of tangency of the conical portion with the spherical portion of the bulb;

On the right side of Figure 15, $e'$ is the angular spread, from the nadir, of a transparent portion of the bottom of the spherical portion of the bulb;

$f'$ is the angular spread, measured from the nadir, of the opaque specular reflective medium on the lower spherical portion of the bulb when $e'=O$; and is the angular position of the upper edge of such area when $e'$ is not equal to O;

$f'-e'$ is the angular spread of the opaque specular reflective medium on the lower spherical portion of the bulb, when $e'$ is greater than O, i. e. when a transparent portion of the lower spherical part of the bulb exists.

$i'$ is the angular spread of the opaque specular reflective medium on the conical portion of the bulb;

$g'$ is the angular spread of the opaque specular reflective medium on the upper spherical portion of the bulb;

$g'_3$ is an angular spread of the opaque specular reflective medium on the upper spherical portion of the bulb which is greater than O and less than $g'$;

T' is the point of tangency of the conical portion with the spherical portion of the bulb; and further;

$r$ is the radius of the spherical portion of the bulb;

$h$ is the vertical distance of the light source from the center of the spherical portion of the bulb;

Angle ($a$) is the angle at which any ray of light emerges from the bulb, called alpha;

$\theta$ is the angular position of any ray of light in the axial plane, before it undergoes reflection; or the angular direction of any bare-lamp ray, both measured counter clockwise from the nadir;

$s$ is the angle between the axis of the bulb and the sides of the conical portion of the bulb, measured from the nadir;

$n$ is any integer, designating a certain light-ray;

$m$ is the number of times a particular light-ray is reflected;

R represents the reflection coefficient of the opaque specular reflective medium;

$dv$ represents any small, or differential, vertical angle formed by two planes intersecting along the axis of the bulb and in which the given mathematical equations are solved;

JJ represents a sectional plane taken in said differential vertical angle;

QH is a line drawn perpendicular of ray WZ, or $I_1(a)$;

V is the vertex of angle $s$, between the conical sides extended to intersect the axis;

$\phi$ represents the angle between line HW and the axis of the bulb;

H represents the center of the spherical portion of the bulb;

S represents the location of the center of the light source.

In planning practical street lighting systems utilizing our invention, it is only necessary to follow the procedure now given in our specifications. If we assume that substantially uniform horizontal illumination is the result desired and assuming, also, the value of $M=6$, we may calculate and construct by means of the prototype curve-values given in Figure 7 an ideal prototype curve for symmetric distribution.

Having constructed such a prototype curve of light-distribution, we now have a pattern to guide us in the design of the reflecting surface or surfaces, to be placed upon our electric light bulb and their magnitude and location, or placement. Since the light emanating from the usual forms of electric light bulbs, when in its natural state, as far as the shape of its curve of distribution is concerned, is very poorly adapted to the production of effective, practical illumination of almost any specific work space and especially for the ideal uniform horizontal illumination of the streets, boulevards, highways, and other thoroughfares, as well as airports and other large outdoor public spaces, where planned scientific illumination is desired, it is necessary to so alter and remold the natural tore, or solid of light emitted by the bare street lamp as shown in curve A Figure 10 as to reshape it into practical compliance with the shape indicated by the ideal prototype curve B in Figure 10.

Fortunately it is within the ability of practical illuminating engineers to accomplish this purpose providing a process is at hand, because the crude mass of light sent out by the usual form of electric light bulbs is a very plastic medium, and each and every ray of it can, by such proper procedure, be easily bent by reflection and redirected into useful planes and the whole light-mass, molded into an ideal form for the solution of a given problem, such as planned scientific street lighting, providing a process and the means for the transformation of the natural non-useful light-mass from the bare electric light bulbs can be provided. It is with such a process and the concrete structure which will produce the resultant transformation in an effective, efficient and useful manner that our invention is concerned.

In Figure 10, all curves of which are symmetric:

Curve A represents light-distribution from bare street-lighting lamp.

Curve B represents the shape of the light-distribution from prototype curve (not drawn to scale).

Curve C represents light-distribution from a street-lighting unit constructed in accordance with our process.

Curve D represents light-distribution from a street-lighting unit equipped with prismatic refractor.

We may now proceed with the transformation of the bare-lamp curve into the prototype by determining the additive and subtractive values of candlepower at all angles to reshape it for practical use, for symmetric distribution.

$Ob$ from curve $A$ (Figure 10) = bare lamp cp. directed at angle $a$.

$Oc$ from curve $B$ (Figure 10) = required prototype cp. at angle $a$.

$bc$ (Figure 10) = cp. required to be added to $Ob$ to produce $Oc$.

Since $Oc = Ob + bc$

Therefore $bc = Oc - Ob$ = cp. required to be added to $Ob$ to produce $Oc$; use can be made directly of the values in Figure 7.

By repeating the above process for each 10 degrees, starting with 5° from the nadir, the required additive and subtractive candlepower needed at each angle can be ascertained.

Assuming that the candlepower value at the center of each 10 degree zone represents its average candlepower, the flux of light required to be added to each zone can be calculated by the aid of the following table which gives the factors by which these candlepower values should be multiplied to give the zonal lumens or the lumens required in each 10 degree zone.

These factors are the equivalents of the actual square feet in these zones on a sphere of one-foot radius.

They are used with symmetric light-distributions.

*Multiplying factors to obtain zone lumens from average zone candlepower*

| Zone | | Multiplying factor |
|---|---|---|
| 0 to 10° | 170 to 180° | 0.095 |
| 10 to 20° | 160 to 170° | 0.283 |
| 20 to 30° | 150 to 160° | 0.463 |
| 30 to 40° | 140 to 150° | 0.628 |
| 40 to 50° | 130 to 140° | 0.774 |
| 50 to 60° | 120 to 130° | 0.897 |
| 60 to 70° | 110 to 120° | 0.992 |
| 70 to 80° | 100 to 110° | 1.058 |
| 80 to 90° | 90 to 100° | 1.091 |

When extreme accuracy, or accuracy greater than that given by the above choice of 10 degree zones and their constants is desired, zonal angles of any desired magnitude may be chosen and in like manner their constants determined and used.

The 10 degree zone chosen herein is the one made use of in all practical work of this character in illuminating engineering.

To use these factors with the curve of any lighting unit, the candlepower at 5 degrees is multiplied by the 0 to 10 degree factor to obtain lumens in the 0 to 10 degree zone; the candlepower at 15 degrees is multiplied by the 10 to 20 degree zone factor to obtain the lumens in the 10 to 20 degree zone, etc. The zonal lumens for any large zone is the sum of the lumens thus determined in all of the 10 degree sections of the zone.

Having thus determined the deficiencies of the bare lamp-distribution in zonal lumens for each of the 10 degree zones as above outlined and having determined the required additive and subtractive lumens needed in each zone, we then spread the specular reflective substance over such predetermined areas on the surface of the light bulb itself to supply the already ascertained deficiencies in each zone. We have found in practice that when $M = 6$ the top line of the reflector-substance surface on the bulb subtends an angle of 60 degrees at the center of the filament and the bottom line of the upper zonal reflector substance subtends an angle of 170 degrees at the center of the filament, when $M=6$ and the bulb is mounted base up.

We have also found that the top line of the reflector substance of the lower zonal reflector surface subtends an angle of 60 degrees at the center of the filament.

Inasmuch as the location of the center of the filament in manufactured lamps will not uniformly occupy the center position of the bulb, it is obvious that the exact position of these zone-boundaries will vary accordingly.

Having thus described the process of forming a reflector on an electric light bulb for symmetric light-distribution suitable for obtaining substantially uniform horizontal street illumination without any controlling or directing accessories, we may now proceed with the process of transforming this symmetrical light-distribution into an asymmetric directional light-distribution suitable for the utilization of the zonal lumens which in said symmetric light-distribution, fall ineffectively outside the boundaries of the street pavement and sidewalks.

Either the point-by-point method, or the zonal-flux method, may be used for the determination of the number of lumens which will fall on the working plane of the street and the number of lumens which will fall on either side of the working plane of the street.

For the light-units which have a symmetrical distribution of light about a vertical axis, the zonal-flux method of making these determinations is far less laborious than the point-by-point method.

The zonal-flux method is based on the fact that, with any given unit which has a symmetrical distribution of light, only a certain proportion of the total lumens given off by the unit will fall on the street. This proportion depends on the street width and the location, mounting height, and vertical light distribution of the unit, as sketched in Figure 11. The curves in Figure 12 have been worked out in the literature of the art and show the percentage of the total lumens, in each 10 degree zone, which will fall on the working plane of the street, for any given ratio of street width to mounting height of the lighting-unit. From this data and from the symmetrical distribution curve of the unit, which gives the lumens emitted in the various 10 degree zones, the total number of lumens falling on the working plane of the street and off, may be calculated.

In other words, the question can be determined as to how many of the total lumens emitted by a street-lighting unit are effective on the working plane of the street. It is borne in mind that the primary object of street-lighting is to illuminate the street pavement, secondarily the sidewalk areas and incidentally the lawns, building-fronts, etc.

We then find by subtraction, the number of zonal lumens in each 10 degree zone which would fall in ineffective locations, the summation of which ineffective lumens are available for redirection by reflection into useful zones, less the small loss caused by such reflection.

Because of the asymmmetry of the light distribution from street-lighting units using specular reflective surfaces on the bulb to produce asymmetric directional control of the light, the above or any similar zonal-flux method of calculating the distribution of light on the street's working plane cannot be used, since no single value of candlepower can be assigned to any zone and be called the average for that zone.

A complete photometric exploration of such a street-lighting unit would consist not only of one vertical distribution curve, as is the case with a symmetric unit, but of a series of them showing the horizontal and vertical distribution curves in planes at various angles to the axis of the unit and the accuracy of the method is increased as desired by increasing the number of exploratory curves ad libitum.

Figure 9 shows the general shapes of exploratory curves of this nature taken at various angles about a street-lighting unit. This particular series includes a vertical distribution at right angles to the curb, a vertical distribution in a plane at 10 degrees out from the curb through the maximum zone, and a distribution taken at a vertical angle of 85 degrees from the nadir, which is the maximum lateral angular cone for this particular unit. At this angle the asymmetric directional nature of the distribution is most pronounced, the candlepower reaching a value of several times the rated candlepower of the clear lamp alone. Similar curves can be taken at various other angles and planes to secure the required data to solve a particular problem.

A method of determining the lumens in each, and/or all, zones, effective on each, and/or all, unit surface-sections of the working plane of the street as defined above, has been developed for an asymmetric directional street-lighting unit, as follows:

A diagrammatic section of a street with an asymmetric street-lighting unit mounted, at U, on a lamp-post of any height is shown in perspective in Figure 13.

In the vertical plane passing through the unit and directly across the street at right angles to the curb, an arc of 90-degrees is drawn and another one is drawn in a plane through the line of the street lights. Each of these quadrant-arcs is divided into desired zones as indicated and planes are passed through to the points of division on the quadrants. The planes thus passed through the quadrants will be at right angles to each other and their intersections with the street surface will be lines forming rectangular sections of the street's surface, such as that indicated by the intersection of the 20 and 30 degree planes intersecting parallel to the curb and the 40 and 50 degree planes intersecting at right angles to the curb line.

The number of lumens emitted by the one light-source U, and directed by it into each surface-section similar to the one just described, can be calculated by means of the principle involved in the definition of the lumen, since a lumen (the unit of luminous flux) is defined as the flux emitted in a unit solid angle (steradian) by a source of one candlepower. Therefore the lumens directed through each of the pyramids formed by the above described intersecting planes can be obtained by multiplying the average candlepower of the source over the pyramid in question by the spherical angle, S. The average candlepower is taken as that in the direction of the ray joining the light source, U, and the middle of each street surface-section and it is determined by the horizontal angle H and the vertical angle V. Simple trigonometric derivations give the following equations for obtaining the values of these angles:

$$\tan V = (\tan^2 V_c - \tan^2 V_s)^{\frac{1}{2}}$$

$$\tan H = \frac{\tan V_c}{\tan V_s}$$

Tables of the values of these angles have been prepared and are available in the literature of the art or their values can be calculated for each case under investigation. Having obtained them it is now possible to read off the midzone candlepower from the exploratory series of distribution curves of the street-lighting unit for which the calculations are being made, interpolating for odd angular values when necessary and assuming straight-line variation between successive known values, unless actual trend of variation is known. A table of these values of candlepower, as thus calculated for the street-lighting unit under investigation, may then be compiled. Such tables as those described above, usually include for each zonal section, values of horizontal angle, H; vertical angle, V; spherical angle, S; candlepower $cp$. at the center of S; the number of lumens, L, falling upon the street surface-sections through each spherical angle, S, and strip totals as well as grand totals of lumens falling on the street, or any portion or portions of the street desired to be surveyed.

The value of the spherical angles S can be found either by the standard method of double integration for an area, or by the approximate trigonometric formula:

$$S = \frac{((\tan (V_s + Y^\circ) - \tan (V_s - Y^\circ)) \times ((\tan (V_c + Y^\circ) - \tan (V_c - Y^\circ))}{(1 + \tan^2 V_s + \tan^2 V_c)^{\frac{1}{2}}}$$

when $Y^\circ$ is half the spherical angle of which $V_s$ and $V_c$ are the midzone angles. As explained above, the lumens in each of these spherical angles can now be obtained by multiplication of the value of the spherical angle by the midzone candlepower. Collection of the sectional lumens thus obtained may now be made in any desired combinations, giving, by summation, a complete survey of the illumination of the working plane of the street as well as such surfaces as fall outside the useful working planes. The average horizontal illumination in foot candles can be obtained for any, and/or all such summation areas, or for the total area, by dividing the total lumens-value for a given area by the area in square feet of the surface-section under consideration.

By the use of the above method the additive and subtractive numbers of zonal lumens needed to make the necessary changes in the light-distribution of the street-lighting unit under investigation to transform the light-distribution of our symmetric processed electric street-lighting units into the asymmetric directional type of light-distribution required for our efficient process of producing street-lighting from asymmetric lighting-units, by so spreading opaque specular reflective substance over predetermined areas of the surface of the electric street-lighting bulb as to redirect the required additive and subtractive zonal lumens into the proper zones, or surface-section areas, as may be required.

The determination of the candlepower required to be emitted at any angle by the street-lighting unit having an asymmetric directional light-distribution curve in order to produce the desired illumination on the working plane of the street, or the desired intensity at any and/or all, points, is made by the following well known formula:

$$cp. = \frac{Ih^2}{\cos^3 a}$$

By the use of this formula, a complete analysis of the candlepower distribution necessary to be emitted by our asymmetric street-lighting unit to produce the desired illumination on the street, can be made.

Having thus determined the deficiencies and excesses of the bare-lamp distribution in both candlepower and in zonal lumens, as above outlined, their control by opaque specular reflecting areas on such portions of the surface of the bulb as will intercept some of or all the rays of light in directions in which the bare-lamp light-distribution curve exceeds the prototype light-distribution curve, will so redirect said light by one or more reflections that said light emerges from the bulb in directions in which the prototype light-distribution curve exceeds the bare-lamp distribution curve, thus supplying substantially all of the candlepower and lumen deficiencies of the bare-lamp. The following mathematical equations express the relations between the said bare-lamp and prototype light intensities and the lamp parameters and constants, for any differential vertical angle formed by two planes intersecting along the axis of the bulb; and when these equations are solved for the particular conditions, the ideal to be attained is established.

$$I_P(a) = I_0(a) + I_1(a) + I_2(a) + I_3(a) + \ldots + I_n(a),$$

wherein $I_0(a) = I_L(\theta)$ for those values of angle $(a)$ at which light from the source emerges from the bulb without impinging upon the opaque specular reflective medium, and $I_0(a) = 0$ for those values of angle $(a)$ at which light from the source does impinge upon the opaque specular reflective medium, and where $$I_1(a) = R\, I_L(\theta)\, \frac{\sin \theta}{\sin a}\, \frac{d\theta}{da}$$

for values of angle $(a)$ greater than $$120° - \tan^{-1} \frac{\sqrt{3}}{1 + \frac{2k}{r}} \quad (1a)$$

and less than $$120° + 2g - \tan^{-1} \frac{\sin(60°+g)}{\cos(60°+g) + \frac{k}{r}} \quad (1b)$$

and also less than $$\frac{1}{2}\left(\sin^{-1} \frac{k \sin \theta + \theta}{r} - 60° - g'\right) \quad (1c)$$

and $I_1(a) = 0$ for all other values of angle $(a)$ and wherein angles $a$ and $\theta$ are related by the equation (1) $\quad a = \theta + 2 \sin^{-1} \frac{k}{r} \sin \theta - 180°$ with $\theta$ greater than 180° but less than 360°; and where $$I_2(a) = R\, I_L(\theta)\, \frac{\sin \theta}{\sin a}\, \frac{d\theta}{da}$$

for all values of angle $(a)$ greater than $$120° - \tan^{-1} \frac{\sqrt{3}}{1 - \frac{2k}{r}}$$

and less than $$120° - \tan^{-1} \frac{\sqrt{3} + \sin g'}{1 + \cos g' + \frac{k}{r}}$$

and also less than $$60° + \tan^{-1} \frac{\frac{\sqrt{3}}{2}\frac{k}{r} + \tan i}{1 + \frac{k}{2r}}$$

and $I_2(a) = 0$ for all other values of angle $(a)$ and wherein angles $(a)$ and $\theta$ are related by the equation (2) $\quad a = 300° - \theta$ with $\theta$ greater than 180° and less than 360°; and where $$I_3(a) = R^2\, I_L(\theta)\, \frac{\sin \theta}{\sin a}\, \frac{d\theta}{da}$$

for all values of angle $(a)$ which result from the equations (3) $\quad a = 60° - \tan^{-1} \frac{\sqrt{3} + \sin g_3}{1 + \frac{k}{r} + \cos g_3} - 2g_3$ (4) $\quad a = 30° + \frac{1}{2}(g_3 + f_3)$ when the parametric angle $g_3$ is greater than zero and less than $g$ and the parametric angle $f'_3$ is either greater than $-e$ and less than $e'$ or else greater than $f'$ and less than $(120° - g')$ and $I_3(a) = 0$ for all other values of angle $(a)$ and where angles $(a)$ and $\theta$ are related by the parametric equations (5) $\quad \theta = 180° - \tan^{-1} \frac{\sqrt{3} + \sin g_3}{1 + \frac{k}{r} + \cos g_3}$ (6) $\quad a = 60° - \tan^{-1} \frac{\sqrt{3} + \sin g_3}{1 + \frac{k}{r} + \cos g_3} - 2g_3$ with $\theta$ greater than 0° and less than 180°.

A high degree of accuracy or close approximation to the prototype, if desired, can be obtained by means of this disclosure for any number of values of light intensities at all selected angles; and in all differential vertical angles. We will now work out a typical application to candlepower intensities to exemplify the action of the reflecting areas.

Suppose now a beam leaves a light source in a sphere at angle $\theta$ with the vertical, having an intensity $I(\theta)$. This light has symmetry about a vertical axis. Its solid angle can therefore be taken as a zone. Let $d\theta$ be the angle subtended by the zone, then its solid angle is $$\frac{2 \times 3.1416\, r \sin \theta\, d\theta}{r} = 2 \times 3.1416 \sin \theta\, d\theta$$

Suppose that by reflection, or reflections, from the spherical surface this beam is changed to have angle ($a$) with the vertical. Its spread, $da$, may be different now. Anyway, the solid angle subtended at the apparent source is $$\frac{2 \times 3.1416\, r \sin a\, da}{r} = 2 \times 3.1416 \sin a\, da$$

thus the beam started off with an intensity $I_1(\theta)$ in a solid angle $$\frac{2 \times 3.1416\, r \sin \theta\, d\theta}{r} = 2 \times 3.1416 \sin \theta\, d\theta$$

After reflection it is confined to a solid angle $$\frac{2 \times 3.1416\, r \sin a\, da}{r} = 2 \times 3.1416 \sin a\, da.$$

Its intensity is now $$I_1(\theta) \frac{\sin \theta\, d\theta}{\sin a\, da} = I(\theta) \frac{d \cos \theta}{d \cos a}$$

If the solid angle $a \times 3.1416 \sin a\, da$ is larger than $2 \times 3.1416 \sin 0\, d\theta$, the intensity is reduced by the factor $$\frac{\sin \theta\, d\theta}{\sin a\, da}$$

This is what the foregoing expression says.

When a beam is reflected by a plane or conical surface, $$d\theta = da, \text{ so } \frac{d\theta}{da} = 1.$$

Here $d\theta = da$, but $\theta$ does not equal angle ($a$), therefore $\sin a$ does not equal $\sin \theta$. Here $\sin a$ is greater than $\sin \theta$, so the beam has smaller intensity after reflection, in the ratio $$\frac{\sin \theta}{\sin a}$$

When a beam is reflected by a spherical surface, $d\theta$ does not equal $da$, so $$\frac{d\theta}{da}$$

does not equal 1.

Where $\sin a$ is greater than $\sin \theta$, and $da$ is greater than $d\theta$, $$\frac{\sin \theta\, d\theta}{\sin a\, da}$$

is less than 1, and the beam is reduced in by reflection.

We have treated the source of light as a point source only. Any actual filament will have a "center of brightness" at some point, equivalent to a point source. The chief practical difference between the actions of a point source and an actual source is that the limiting edges of beams of light will not be sharp in the latter case—they will be rounded off; and this is a good thing.

We consider the source at a vertical distance $k$ from the center of the spherical portion of the bulb. This distance $k$ is one of the lamp parameters. The others are listed and defined above.

For the purposes of illustration, we will now proceed to show how the values of the various intensities in any direction were obtained. The bare lamp curve is changed by reflections at the opaque specular reflective surfaces. At any angle ($a$) the intensity will be that of the barelamp plus the gains brought about by reflections—single reflections, double reflections, and others. We have treated each gain separately, and have labeled them $I_1(a), I_2(a), I_3(a), \ldots I_n(a)$.

$I_1(a)$ is the gain at angle ($a$) due to a ray which undergoes a single reflection from the spherical reflecting area $g$ or as shown in Figure 15, angle $g$ denotes angular spread of the spherical area that is coated on the axial plane selected. Angle $g$ is the quantity that limits angle ($a$), and the range of $I_1(a)$; if angle $g$ is made greater, the range of $I_1(a)$ is increased. Thus, in Figure 16, if angle $g'$ is increased so that the reflected ray strikes the bottom edge of the spherical portion of the bulb, any further increase in angle $a$ decreases the range of $I_1(a)$. The other limit of the range is fixed by the point of tangency of sphere and cone, $T$ or $T'$.

It will readily be seen from the above discussion that if the angular spread of opaque specular reflective medium be extended to the different limiting points on the right hand side of the axis of the bulb than on the left hand side, i. e., if the values of $e, f, g,$ and $i$ are not identical with $e', f', g',$ and $i'$, in all axial planes, but are different in every axial plane or in different groups of axial planes for different reflective areas, then the lamp will give a light-distribution which is not symmetrical around the central axis VH of the lamp but is asymmetrical around such axis and the lamp, when lighted, will produce asymmetrical uniform, horizontal, street illumination. For such a lamp, therefore, it is necessary to solve for every value, or group of values, of each of the quantities, $e, f, g,$ and $i$, and $e', f', g',$ and $i'$. We have now completely analyzed the effect of the location of the areas of opaque specular reflective medium for such asymmetrical light-distribution.

We have derived a mathematical relation for $I_1(a)$, to express its intensity at any angle ($a$).

Likewise we have treated $I_2(a), I_3(a), \ldots I_n(a)$, so that their intensities and ranges will be functions of the lamp parameters $k, r, s$, angle $e$, angle $f$, angle $g$, angle $i$, and their primes, and so on. By changing $e, f, g, i$, and so on, we can change the intensity in any direction, i. e. by arranging the limits of the areas of specular reflective medium we can change the intensity in any direction, thus approximating the prototype curve for uniform horizontal street lighting.

To determine the intensity in any direction the combination of the lamp parameters, constants and variables, are determined, which will, when found by solving their mathematical relations, give the $I(a)$ values whose summation will approximate the $I_P(a)$ values of the prototype light-distribution curve.

The bare-lamp has a certain intensity curve. We may denote the intensity of its light ray at any angle $\theta$ by $I_L(\theta)$. $\theta$ is reckoned from a downward vertical line, or nadir, and counter clockwise.

$I_1(a), I_2(a), \ldots I_n(a)$ will be written in terms of $I_L(\theta)$.

$\theta$ is the angle that the original bare-lamp ray makes with the vertical, or nadir, before reflection but after reflection (or reflections) it makes angle $(a)$ with the nadir.

We determine an expression for $\theta$ in terms of angle $(a)$ in every case. Then for a given angle $(a)$, $\theta$ is found, and $I_L(\theta)$ can be read from the bare-lamp curve.

Also $$\frac{\sin \theta \, d\theta}{\sin a \, da} \text{ or } \frac{d \cos \theta}{d \cos a}$$

can be calculated. In this way $$R^m I_L(\theta) \frac{\sin \theta \, d\theta}{\sin a \, da}$$

can be calculated, and this is the gain in the direction of angle $(a)$, for this particular reflection (or multiple reflections).

The summation of bare-lamp candlepower at angle $(a)$ and the gains in candlepower at angle $(a)$ brought about by the intensities $I_1(a), I_2(a), I_3(a), \ldots I_n(a)$ produces the approximation to the prototype intensity $I_P(a)$ at angle $(a)$. Therefore $$I_P(a) = I_0(a) + I_1(a) + I_2(a) + I_3(a) \ldots I_n(a)$$

The following is the investigation and determination of $I_1(a)$. $I_1(a)$ is the gain in intensity at angle $(a)$ caused by one reflection from the upper spherical portion $g$ of the bulb, Figure 15.

As shown in said Figure 15, $HS = k$ $\sin \text{ angle } YSH = \sin (\theta - 180°) = -\sin \theta$ $\cos \text{ angle } YSH = \cos (\theta - 180°) = -\cos \theta$ $HY = -k \sin \theta \quad YS = -k \cos \theta$ $\sin \text{ angle } YWH = \frac{YH}{HW} = \frac{-k \sin \theta}{r}$ angle $HWZ$ = angle $YWH = +\sin^{-1}\frac{-k \sin \theta}{r}$ $a = \theta + 2 \text{ angle } HWZ - 180°$ (1) $a = \theta + 2 \sin^{-1}\frac{-k \sin \theta}{r} - 180°$ ($a$ in terms of $\theta$)

Angle $a$ is a minimum when the ray $I_L(\theta)$ strikes the point of tangency T
Then $$\phi = 60°$$

and $$\theta - 180° = \tan^{-1}\frac{\frac{\sqrt{3}}{2}}{\frac{1}{2} - \frac{k}{r}} = \tan^{-1}\frac{\sqrt{3}}{1 + 2\frac{k}{r}}$$

and $$a = 2 \times 60° - \tan^{-1}\frac{\sqrt{3}}{\frac{1 - 2k}{r}} =$$

$$120° - \tan^{-1}\frac{\sqrt{3}}{\frac{1 + 2k}{r}} \quad (1a)$$

Angle $a$ is maximum when the ray $I_L(\theta)$ strikes the bottom of $g$
Then $$\phi = 60° + g$$

and $$\theta - 180° = \tan^{-1}\frac{\sin\left(\frac{180°}{3} + g\right)}{\cos\left(\frac{180°}{3} + g\right) + \frac{k}{r}} =$$

$$\tan^{-1}\frac{\sin (60° + g)}{\sin(60° + g) + \frac{k}{r}}$$

and $$a = 120° + 2g - \tan^{-1}\frac{\sin\left(\frac{180°}{3} + g\right)}{\cos\left(\frac{180°}{3} + g\right) + \frac{k}{r}}$$

$$- = 120° + 2g - \tan^{-1}\frac{\sqrt{3} \cos g + \sin g}{\cos g - \sqrt{3} \sin g + \frac{2k}{r}}$$

(1b) $a = 120° + 2g - \tan^{-1}\frac{\sin (60° + g)}{\sin (60° + g) + \frac{k}{r}}$ The maximum value of angle $(a)$ may also be limited by the angle $g'$, i. e., the coating on right hand side.

Suppose the point of impingence W of the ray is not at the bottom of the angle $g$ on the left side, but, that point Z of emergence of $I_1(a)$ from the bulb is at the bottom of angle $g'$ on the right side. That is, angle $g$ may be coated below point W so that this point W is not the limiting factor; rather, the point Z of emergence determines the maximum value of angle $(a)$. If angle $(a)$ were any greater the ray would strike the coating on angle $g'$.
The relations are then $\phi$ = angle $WHV$ = angle $WHY$ +
angle $WSH = \sin^{-1}\dfrac{-k \sin \theta}{r} + (\theta - 180°)$ angle $VHQ = \dfrac{180°}{2} - a$ angle $QHZ = WHQ$ = angle $WHV$ +
angle $VHQ = \sin^{-1}\dfrac{-k \sin \theta}{r} +$
$\theta - 180° + \dfrac{180°}{2} - a$ angle $VHZ$ = angle $VHQ$ + angle $QHZ$ =
$\left(\dfrac{180°}{2} - a\right) + \left(\sin^{-1}\dfrac{-k \sin \theta}{r} + \theta - \dfrac{180°}{2} + 180° - a\right) = \sin^{-1}\dfrac{-k \sin \theta}{r} + \theta - 2a$ also when $Z$ coincides with lower limit of $g'$, angle $VHZ = 60° + g'$ therefore $60° + g' = \sin^{-1}\dfrac{-k \sin \theta}{r} + \theta - 2a$ (1c) $a = \dfrac{1}{2}(\theta - 60° - g' + \sin^{-1} - k \sin \theta)$ This is the maximum value of angle $(a)$ when the ray is cut off by $g'$.

In other words $I_1(a)$ lies say between two values of angle $(a)$. One limit is fixed by the point of tangency $T$ of sphere and cone. The other limit depends on angle $g$, so by varying $g$ the range of $I_1(a)$ can be varied. Angle $g$ denotes the angular spread of the upper spherical coated area. If $g$ is increased the latter limit is increased, unless the ray $SWZ$ strikes the bottom of the zone at $g'$. When this happens, any further increase in $g$ decreases the range of $I_1(a)$ in this direction, because these rays are then reflected in other directions.

These three limiting equations just found for determining the angular spread of the opaque specular reflective medium on the upper spherical portion of the bulb have already been cited herein. If now we select angle $(a)$, angle $\theta$ now can be found. Then $I_L(\theta)$ can be read from the bare-lamp light-distribution curve and $\dfrac{\sin \theta}{\sin a}$ can be found. Now we get $\left(\dfrac{d\theta}{da}\right) = 1 - \dfrac{2k}{r} \cos a$ and $\dfrac{\sin \theta}{\sin a} = \dfrac{\sin\left(a - \dfrac{2k}{r}\sin a\right)}{\sin a}$ In practice, $\dfrac{k}{r}$ is small, so $\dfrac{k}{r}$ can be neglected in comparison with 1. With this approximation, $\sin^{-1}\dfrac{k}{r} = \dfrac{k}{r}$ (when the angle is measured in radians). Then $\theta = 180° - a + \dfrac{2k}{r} \sin a$ $\left(\dfrac{d\theta}{da}\right) = 1 - \dfrac{2k}{r} \cos a$ $I_1(a) = R\, I_L(\theta) \dfrac{\sin \theta\, d\theta}{\sin a\, da}$ $= R\, I_L(\theta) \dfrac{\sin\left(a - \dfrac{2k}{r}\sin a\right)}{\sin a}\left(1 - \dfrac{2k}{r}\cos a\right)$ $= R\, I_L(\theta)\left(1 - \dfrac{2k}{r}\cos a\right)2$ We can now solve this equation for $I_1(a)$, which can be done, since they are expressive of the light intensity due to the location of the opaque specular reflective medium on the bulb surface, and all the quantities on the right hand side being known. The values of $g$ and $g'$, which depend on the angular areas on the upper spherical surface of the bulb are found from the equations above cited.

In like manner we find values for $I_2(a)$. $I_2(a)$ is the gain in intensity at angle $(a)$ caused by one reflection from the cone.

The minimum limiting value of angle $(a)$ for $I_2(a)$ ray occurs when the $I_L(\theta)$ ray strikes the point of tangency $T$ and this value becomes $120° - \tan^{-1}\dfrac{\sqrt{3}}{1 - \dfrac{2k}{r}}$ We also find that the upper limiting, or maximum, value of angle $(a)$ and $I_2(a)$ ray when it strikes the bottom of the opaque specular reflective medium on the emergence side is $a = 120° - \tan^{-1}\dfrac{\sqrt{3} + \sin g'}{1 + \cos g' + \dfrac{k}{r}}$ and that for the limiting value of angle $(a)$ when the $I_2(\theta)$ ray strikes higher than the upper edge of the cone, $$a = 60° + \tan^{-1} \frac{\frac{\sqrt{3}}{2}\frac{k}{r} + \tan i}{1 + \frac{k}{2r}}$$

and $$a = 2 \times 180° - \theta - \frac{180°}{3}$$
$$a = 300° - \theta$$
$$\theta = 300° - a$$

For $I_2(a)$ these relations exist:

$$\tan\left(\frac{4}{3} \times 180° - \theta\right) = \frac{\tan i + \frac{k}{r}\sin\frac{180°}{3}}{1 + \frac{k}{r}\cos\frac{180°}{3}}$$

$$\theta = \frac{4}{3} \times 180° - \tan^{-1}\frac{\tan i + \frac{\sqrt{3}}{2}\frac{k}{r}}{1 + \frac{k}{2r}}$$

$$\theta = 240° - \tan^{-1}\frac{\tan i + \frac{\sqrt{3}}{2}\frac{k}{r}}{1 + \frac{k}{2r}}$$

$$\therefore a = 300° - \left(240° - \tan^{-1}\frac{\tan i + \frac{\sqrt{3}}{2}\frac{k}{r}}{1 + \frac{r}{2r}}\right)$$

$$a = 60° + \tan^{-1}\frac{\tan i + \frac{\sqrt{3}}{2}\frac{k}{r}}{1 + \frac{k}{2r}} \text{ as above}$$

$$\sin a = \sin 300° \cos \theta - \cos 300° \sin \theta$$
$$\sin a = -\frac{\sqrt{3}}{2}\cos\theta - \frac{1}{2}\sin\theta = \frac{1}{2}(\sin\theta - \sqrt{3}\cos\theta)$$

Also $d\theta = da$ $$\therefore \frac{\sin\theta\, d\theta}{\sin a\, da} = \frac{1}{2}(1 - \sqrt{3}\cot a)$$

$$I_2(a) = R\, I_L(\theta) \times \frac{1}{2}(1 - \sqrt{-3}\cot a) = R\, I_L(300° - a) \times \frac{1}{2}(1 - \sqrt{3}\cot a),$$

which can now be solved.

In the foregoing discussion of $I_2(a)$ it was assumed that the opaque specular reflective medium is spread high enough so that the top of the medium on the cone is not the limiting factor, but that the bottom of the zone on the emergence side is the limiting factor. But if the cone is not coated sufficiently high, the cone itself provides the limit.

So, also, the rays, may be traced and calculated which travel from the source to the conical surface, thence to the opposite conical surface, and thence emerge through the spherical portion of the bulb.

The simplest way of handling reflections from a cone is to put a phantom source on the other side of the conical surface and imagine the rays, after reflection, to come from the phantom source.

Rays leave the source S at various angles, to be reflected at the conical surface. After reflection these rays are exactly as if they came from the image of S formed by the cone.

After the first reflection, the rays may strike the cone on the other side. After the second reflection, the rays act exactly as if they had come from a secondary image of the first, or primary, image of S.

Thus it is easy to trace the rays in an axial plane, when dealing with the reflections at the surface of the cone.

As is shown in Figure 11, by the ray marked $I_3(a')$, this ray may be prevented from emergence after the said second reflection by placing opaque specular reflective medium on the bottom of the spherical portion of the bulb, as represented by $f'$, of Figure 16, and be again reflected to the cone for two more reflections before emergence in the direction $I_3(a')$. As this direction does not contribute to the rays at angle $(a)$ of our previous calculations, its effect will be only in relation to the prototype curve at the angle where it actually contributes.

By means of the equations and relations which have been developed and given above and other equations which have been or can be derived in a similar manner, the path of any ray in an axial section of the bulb may be found for any given distribution of reflective medium upon the bulb, in any axial plane, the final angle of emergence may be determined, and the contribution to the total intensity in this direction, angle $(a)$, may be found by evaluating the expression:

$$I(a) = R^m I_L(\theta) \frac{\sin\theta\, d\theta}{\sin a\, da}$$

which has been illustrated above.

For any given distribution of reflective medium on this axial section of the bulb, certain groups of rays will suffer the same reflections in the same sequence. For any one of these groups of rays $I(a)$ will be a continuous function. The boundaries of this interval may be determined by substituting into the proper formulas, the angles, or lengths, giving the positions of the edges of the coated portions, which edges limit this particular group of rays.

For any given distribution of reflective medium it will usually be found that a certain few of these groups of rays are by far the most important and that if $I(a)$ is evaluated for these few groups then the light-distribution is determined closely enough for practical purposes. There are, of course, a great many different possible combinations of reflections for which $I(a)$ may be evaluated. Most of these, however, are not important enough to be considered in practical applications. Typical equations have been given for some of the important ones.

We have set forth what reflections and combination of reflections increase the intensity in different directions. We attain our objective by applying the reflective medium on the bulb to obtain as many of these desirable reflections as possible, and thereby to substantially approximate any desired intensity distribution, for uniform horizontal street illumination.

Having thus described our invention, and illustrated its use, what we claim as new and desire to secure by Letters Patent is:

1. The process of changing an electric street lighting bulb to transform the bare lamp curve of distribution of light emitted by the bulb, when lighted, into an approximation of a prototype, asymmetric light-distribution for asymmetric uniform horizontal street lighting, which comprises the application of an opaque, specular reflective medium upon certain areas of the surface of said bulb to so supplement the direct light with reflected light, that the light is distributed to give prototype asymmetric uniform horizontal street lighting, the extent, location and configuration of said areas in their relation to the light source being in conformity with the laws of the transmission and reflection of light and which can be expressed in the relation:

$$I_P(a) = I_0(a) + I_2(a) + I_3(a) + \ldots + I_n(a),$$

in which $I_0(a) = I_L(a)$ when the opaque specular reflective medium is placed at the angle $$a = \tan^{-1} \frac{\frac{k}{r} \sin a}{1 - \frac{k}{r} \cos a}$$

and $$I_0(a) = 0$$

when the opaque specular reflective medium is not placed at this point, and where $$I_1(a) = R \, I_L(\theta) \frac{\sin \theta}{\sin a} \frac{d\theta}{da}$$

for values of angle $(a)$ greater than $$120° - \tan^{-1} \frac{\sqrt{3}}{1 + \frac{2k}{r}}$$

and satisfying simultaneously the equations $$a = 120° + 2g_1 - \tan^{-1} \frac{\sin(60° + g)}{\cos(60° + g) + \frac{k}{r}}$$

and $$a = \frac{1}{2}\left(\sin^{-1} \frac{-k \sin \theta}{r} + \theta - 60° - g_1\right)$$

for any values of $g_1$ and $g'_1$ where $g_1$ is the angular distance from the point of tangency T on the left side of the bulb down to a point at which the specular reflective medium is present and $g'_1$ is the angular distance from the point of tangency, T, on the right side of the bulb down to a point at which the specular reflective medium is absent and $I_1(a) = 0$ for all other values of angle $(a)$ and wherein angles $a$ and $\theta$ are related to the equation $$a = \theta - 2 \sin^{-1} \frac{-k \sin \theta}{r} - 180°$$

with $\theta$ greater than 180° but less than 360°; and where $$I_2(a) = R \, I_L(\theta) \frac{\sin \theta}{\sin a} \frac{d\theta}{da}$$

for all values of angle $(a)$ greater than $$120° - \tan^{-1} \frac{\sqrt{3}}{1 + \frac{2k}{r}}$$

and satisfying simultaneously the equations $$a = 120° - \tan^{-1} \frac{\sqrt{3} + \sin g'_2}{1 + \cos g'_2 + \frac{k}{r}}$$

and $$a = 60° + \tan^{-1} \frac{\frac{\sqrt{3}}{2} \frac{k}{r} + \tan i_2}{1 + \frac{k}{2r}}$$

for any values of $g'_2$ and $i_2$ where $g'_2$ is the angular distance from the point of tangency T' on the right side of the bulb down to a point at which the specular reflective medium is absent and $i_2$ is the angular distance from the point of tangency T on the left side of the bulb upward to a point at which the specular reflective medium is present, and $I_2(a) = 0$ for all other values of angle $(a)$ and wherein angles $(a)$ and $\theta$ are related by the equation $$a = 300° - \theta$$

with $\theta$ greater than 180° and less than 360°; and where $$I_3(a) = R^2 \, I_L(\theta) \frac{\sin \theta}{\sin a} \frac{d\theta}{da}$$

for all values of angle $(a)$ satisfying simultaneously the equations $$a = 60° - \tan^{-1} \frac{\sqrt{3} + \sin g_3 + 2g_3}{1 + \frac{k}{r} + \cos g_3}$$

$$a = 30° + \tfrac{1}{2}(g_3 + f'_3)$$

where $g_3$ is the angular distance from the point of tangency T on the left side of the bulb down to a point at which the specular reflective medium is present and $f'_3$ is the angular distance from the nadir to a point on the sphere at which the specular reflective medium is absent and $f'_3$ is given a positive sign if to the right and a negative sign if to the left and $I_3(a)=0$ for all other values of angle $(a)$ and wherein angles $(a)$ and $\theta$ are related by the parametric equations $$\theta = 180° - \tan^{-1} \frac{\sqrt{3}-\sin g_3}{1-\frac{k}{r}-\cos g_3}$$

$$a = 60° - \tan^{-1} \frac{\sqrt{3}-\sin g_3}{1-\frac{k}{r}-\cos g_3} - 2g_3$$

with $\theta$ greater than 0° and less than 180°.

2. An electric street lighting bulb having a normal bare lamp curve of distribution of light emitted by the bulb, when lighted and means associated therewith for modifying the distribution, to change the bare lamp curve into an approximation of a prototype asymmetric light-distribution for asymmetric uniform horizontal street lighting, said means comprising an opaque, specular reflective medium upon areas of the surface of said bulb to so supplement the direct light with reflected light, that the light is distributed to give prototype asymmetric uniform horizontal street lighting, the extent, location and configuration of said areas in their relation to the light source being in conformity with the laws of the transmission and reflection of light and which can be expressed in the relation:

$$I_P(a) = I_0(a) + I_2(a) + I_3(a) + \ldots + I_n(a),$$

in which $I_0$ $(a=L_L(a))$ when the opaque specular reflective medium is placed at the angle $$a = \tan^{-1} \frac{\frac{k}{r}\sin a}{1-\frac{k}{r}\cos a}$$

and $$I_0(a) = 0$$

when the opaque specular reflective medium is not placed at this point, and where $$I_1(a) = R\, I_L(\theta) \frac{\sin \theta\, d\theta}{\sin a\, da}$$

for values of angle $(a)$ greater than $$120° - \tan^{-1}\frac{\sqrt{3}}{1+\frac{2k}{r}}$$

and satisfying simultaneously the equations $$a = 120° + 2g_1 - \tan^{-1} \frac{\sin(60°+g)}{\cos(60°+g)+\frac{k}{r}}$$

and $$a = \frac{1}{2}\left(\sin^{-1}\frac{-k\sin\theta}{r} + \theta - 60° - g_i\right)$$

for any values of $g_1$ and $g'_1$ where $g_1$ is the angular distance from the point of tangency T on the left side of the bulb down to a point at which the specular reflective medium is present and $g'_1$ is the angular distance from the point of tangency, T, on the right side of the bulb down to a point at which the specular reflective medium is absent, and $I_1(a)=0$ for all other values of angle $(a)$ and wherein angles $a$ and $\theta$ are relates to the equation $$a = \theta - 2\sin^{-1}\frac{-k\sin\theta}{r} - 180°$$

with $\theta$ greater than 180° but less than 360°; and where $$I_2(a) = R\, I_L(\theta) \frac{\sin\theta\, d\theta}{\sin a\, da}$$

for all values of angle $(a)$ greater than $$120° - \tan^{-1}\frac{\sqrt{3}}{1+\frac{2k}{r}}$$

and satisfying simultaneously the equations $$a = 120° - \tan^{-1} \frac{\sqrt{3}+\sin g'_2}{1+\cos g'_2 + \frac{k}{r}}$$

and $$a = 60° + \tan^{-1} \frac{\frac{\sqrt{3}}{2}\frac{k}{r} + \tan i_2}{1+\frac{k}{2r}}$$

for any values of $g'_2$ and $i_2$ where $g'_2$ is the angular distance from the point of tangency T' on the right side of the bulb down to a point at which the specular reflective medium is absent and $i_2$ is the angular distance from the point of tangency T on the left side of the bulb upward to a point at which the specular reflective medium is present, and $I_2(a)=0$ for all other values of angle $(a)$ and wherein angles $(a)$ and $\theta$ are related by the equation $$a = 300° - \theta$$

with $\theta$ greater than 180° and less than 360°; and where $$I_3(a) = R^2 I_L(\theta) \frac{\sin\theta\, d\theta}{\sin a\, da}$$

for all values of angle $(a)$ satisfying simultaneously the equations $$a = 60° - \tan^{-1} \frac{\sqrt{3}+\sin g_3 + 2g_3}{1+\frac{k}{r}+\cos g_3}$$

$$a = 30° + \tfrac{1}{2}(g_3 + f'_3)$$

where $g_3$ is the angular distance from the point of tangency T on the left side of the bulb down to a point at which the specular reflective medium is present and $f'_3$ is the angular distance from the nadir to a point on the sphere at which the specular reflective medium is absent and $f'_3$ is given a positive sign if to the right and a negative sign if to the left and $I_3(a)=0$ for all other values of angle $(a)$ and wherein angles $(a)$ and $\theta$ are related by the parametric equations $$\theta = 180° - \tan^{-1} \frac{\sqrt{3} - \sin g_3}{1 - \frac{k}{r} \cos g_3}$$

$$a = 60° - \tan^{-1} \frac{\sqrt{3} - \sin g_3 - 2g_3}{1 = \frac{k}{r} - \cos g_3}$$

with $\theta$ greater than 0° and less than 180°.

3. An electric bulb to serve as a unit in a street lighting system and in which a plurality of units are to be mounted in spaced relation both with reference to each other and with reference to the street to be illuminated, said bulb having a filament which is relatively condensed about its focal point and having a normal bare lamp light distribution and means associated therewith for modifying the distribution to change the bare lamp curve into an approximation of a prototype asymmetric distribution of light flux, said means comprising an opaque specular reflective medium upon an area of the bulb curved vertically and positioned in such opposition to said focal point so as to reflect the light therefrom to below the horizontal and also upon an area to one side of and of a different character from, said first mentioned reflecting area for reflecting light from the filament upon said first mentioned area said reflecting areas serving to so supplement the direct light with reflected light that the light is distributed to give an approximation to prototype asymmetric street lighting, the extent, location and configuration of said areas in their relation to the light source being dependent upon and varying with the ratio of the distance between the units, to their elevation, and being such as to give for each unit the prototype light distribution curve called for by the particular ratio.

In witness whereof we have hereunto signed our names.

MORRIS B. BECK.
JOHN D. WHITTAKER.